United States Patent
Biemont et al.

(10) Patent No.: US 7,458,916 B2
(45) Date of Patent: Dec. 2, 2008

(54) CONTROL METHOD AND DEVICE FOR THE PROPULSION MOTOR UNIT OF A MOTOR VEHICLE DRIVEN BY AN INTERNAL COMBUSTION ENGINE

(75) Inventors: Anne Biemont, Saint Cheron (FR); Olivier Fraweel, Saulx-les-Chartreux (FR); Christian Taffin, Le Mesnil Saint Denis (FR)

(73) Assignee: Renault s.a.s., Boulogne Billancourt (FR)

( * ) Notice: Subject to any disclaimer, the term of this patent is extended or adjusted under 35 U.S.C. 154(b) by 330 days.

(21) Appl. No.: 10/544,650

(22) PCT Filed: Feb. 6, 2004

(86) PCT No.: PCT/FR2004/000274

§ 371 (c)(1), (2), (4) Date: Mar. 27, 2006

(87) PCT Pub. No.: WO2004/072458

PCT Pub. Date: Aug. 26, 2004

(65) Prior Publication Data
US 2006/0241835 A1    Oct. 26, 2006

(30) Foreign Application Priority Data
Feb. 6, 2003    (FR) .................................. 03 01399

(51) Int. Cl.
*B60W 10/04*    (2006.01)

(52) U.S. Cl. .................. 477/111; 477/107; 477/110
(58) Field of Classification Search ............. 477/107, 477/110, 111, 906; 701/110; 123/198 D, 123/361, 396, 399, 479
See application file for complete search history.

(56) References Cited

U.S. PATENT DOCUMENTS

| 4,779,597 | A  | * | 10/1988 | Takaku et al. ............... 123/479 |
| 5,960,771 | A  |   | 10/1999 | Watanabe |
| 5,999,875 | A  |   | 12/1999 | Bruedigam et al. |
| 6,073,610 | A  | * | 6/2000  | Matsumoto et al. ......... 123/396 |
| 6,116,214 | A  |   | 9/2000  | Ishida |
| 6,513,492 | B1 |   | 2/2003  | Bauerle et al. |
| 6,805,094 | B2 | * | 10/2004 | Hashimoto et al. .......... 123/396 |
| 6,883,496 | B2 | * | 4/2005  | Suzuki et al. ............... 123/361 |

FOREIGN PATENT DOCUMENTS

DE    34 47 628    7/1986

* cited by examiner

*Primary Examiner*—David D. Le
(74) *Attorney, Agent, or Firm*—Oblon, Spivak, McClelland, Maier & Neustadt, P.C.

(57) ABSTRACT

A control for a vehicle including a controller for a propulsion motor unit, which generates a signal representative of the depression of an accelerator pedal operated by the vehicle driver and detects a degradation of the signal. On detection of such a degradation the speed of the vehicle is regulated if above a threshold value and the operating speed of the engine is regulated if the vehicle speed is below the threshold value.

10 Claims, 1 Drawing Sheet

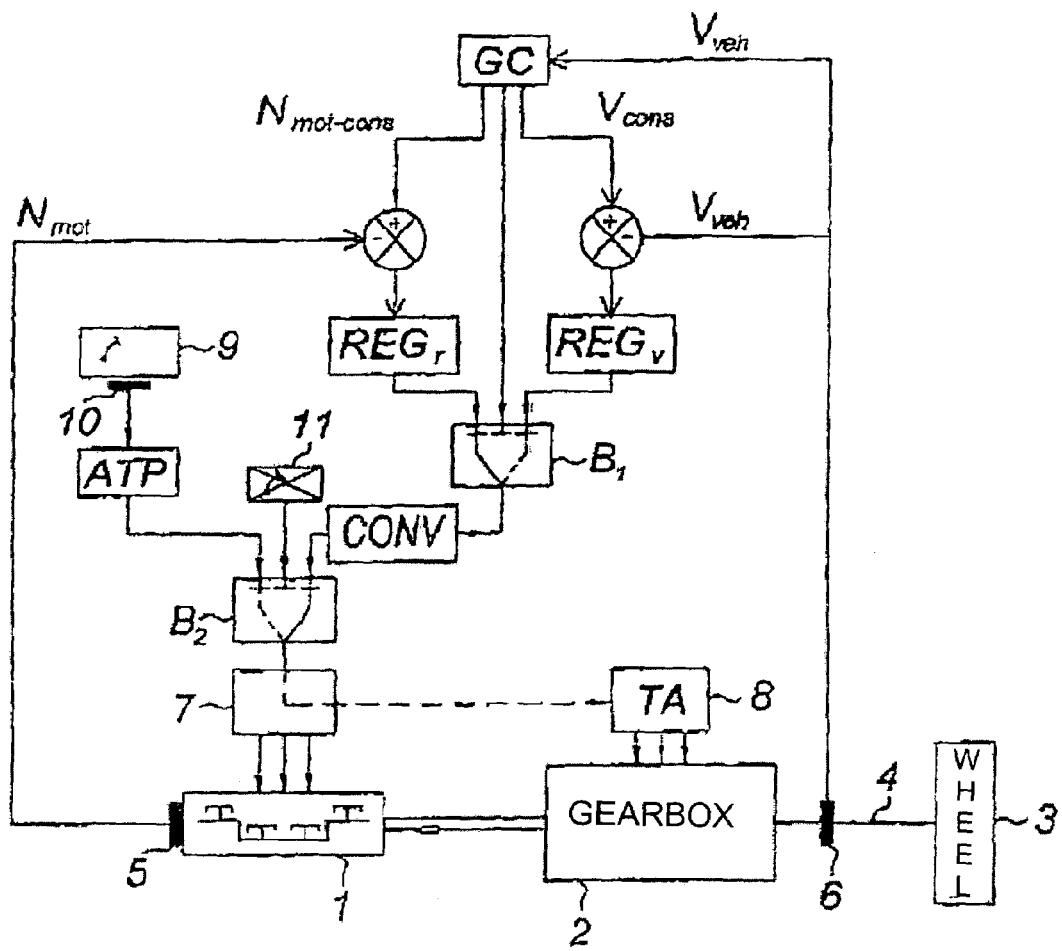

CONTROL METHOD AND DEVICE FOR THE PROPULSION MOTOR UNIT OF A MOTOR VEHICLE DRIVEN BY AN INTERNAL COMBUSTION ENGINE

The present invention relates to a method and to a device for controlling the motive power group of a motor vehicle driven by an internal combustion engine, the said vehicle being equipped with means for controlling the said group, including means for forming a signal representative of the depression of an accelerator pedal initiated by the vehicle operator and means for detecting any degradation of the said signal.

In the event of such a degradation, of mechanical, electrical or electronic origin, for example, it is naturally appropriate for the control device of the motive power group to implement a control strategy designed to pass information normally carried by the signal representative of depression of the accelerator pedal, or in other words the torque demanded by the operator, to the engine of the vehicle. It actually is about ensuring the safety of the vehicle and its passengers and to permit a vehicle to make its way as quickly as possible to a shop for repair of the observed fault.

According to a first known strategy (see German Patent 3447628, for example), there is then delivered, to a calculator for managing the operation of the engine, an information stream that substitutes for that carried by the degraded signal, this information stream corresponding to a fixed, all-inclusive value of the depression of the accelerator pedal, instead of and in place of the variable value normally set by the operator by means of this pedal.

This strategy suffers from the disadvantage that it does not ensure mobility of the vehicle, for example while traveling uphill, because of the fact that it does not take into account the magnitude of the resisting forces then acting on the vehicle.

According to a second known strategy, upon detection of a degradation of the "pedal" information stream, the engine changes to an idling-regulation mode of operation, with a constant speed setpoint.

Immobilization of the vehicle is then no longer a concern. Nevertheless, the vehicle speed is then very slow and does not guarantee safety of the passengers in certain circumstances. This is the case in particular if the fault affecting the "pedal" information stream occurs when the vehicle is involved in an overtaking maneuver at high speed. The sudden drop of vehicle speed following activation of idling regulation surprises and hinders the operator in his maneuver. Furthermore, since the idling speed is low (1300 rpm, for example), the driver is not prompted (by the engine noise) to engage a higher gear, which would permit him to drive his vehicle faster.

When the motive power group contains an automatic transmission (automatic gearbox, robotized gearbox, continuously variable transmission, etc.) that utilizes the "pedal" information stream, the degradation of this stream does not permit this transmission to choose an optimal transmission ratio. The transmission itself then changes to a degraded mode of operation that is unfavorable to the safety and comfort of the passengers and that may even lead to immobilization of the vehicle.

The objective of the present invention is therefore to provide, for controlling the motive power group of a motor vehicle driven by an internal combustion engine, a method and a device that do not suffer from the disadvantages cited hereinabove.

This objective of the invention, as well as others that will become evident upon reading the description hereinafter, is achieved with a control method of the type described in the introduction to the present description, noteworthy in that, upon detection of a degradation of the signal representative of the depression of the accelerator pedal, the vehicle speed is regulated when it is higher than a threshold value and the engine speed is regulated when the vehicle speed is lower than the said threshold value.

As will be seen in detail hereinafter, this strategy makes it possible, in the event of loss of the pedal information stream, to maintain the vehicle speed at a value compatible with maintaining safety of this vehicle and its passengers and, in particular, to guarantee that the vehicle will not become immobilized, regardless of the environment in which this vehicle is traveling.

According to other optional characteristics of the inventive method:

upon detection of degradation of the pedal information stream, the vehicle speed or the engine speed is regulated by means of a torque setpoint which, after conversion to a load setpoint, is substituted for the degraded signal, during the vehicle-braking period, the torque setpoint is lowered to a predetermined minimum value, preferably corresponding to a "foot raised" position of the accelerator pedal, when the vehicle speed crosses the said threshold value, a progressive transition from engine-speed regulation to vehicle-speed regulation or vice versa takes place, the torque calculated by the activated regulator preferably being initialized at the last torque value calculated by the deactivated regulator, when the motive power group contains an automatic transmission, the said load setpoint is delivered to the said automatic transmission at the same time that it is delivered to the engine-control means.

The invention also provides a device for use of this method.

Other characteristics and advantages of the present invention will become evident upon reading the description hereinafter and examining the attached drawing, in which the single FIGURE represents a functional diagram of this device.

This FIGURE schematically represents an internal combustion engine 1 and a gearbox 2 forming part of the motive power group of a motor vehicle, one (3) of the wheels of which is also shown, mounted on an axle 4, at the output of gearbox 2. The vehicle is also equipped in the traditional way with a sensor 5 for the speed $N_{mot}$ of the engine 1 and with a sensor 6 for the vehicle speed $V_{veh}$, sensitive to the rotation of axle 4 of wheel 3.

Engine-control means are represented by block 7, these means commonly having the form of a duly programmed electronic calculator.

The vehicle transmission can be automatic, as has been seen hereinabove. This is schematically represented by block 8 for controlling gearbox 2.

Also shown in the FIGURE is accelerator pedal 9 of the motor vehicle, with which pedal there is associated a sensor 10 for the position or "depression" of this pedal. This "pedal" information stream is transmitted to a block ATP for acquisition and transformation of this information for the purpose of delivering it to engine-control means 7, to inform the latter of the torque demanded by the vehicle operator. Means for detecting a degradation of the "pedal" information are represented by block 11.

According to the present invention, upon detection of such a degradation, the vehicle speed $V_{veh}$ is regulated if it is higher than a predetermined threshold value $V_s$ and the engine speed $N_{mot}$ is regulated when the vehicle speed is lower than $V_s$.

To implement this method, the inventive device comprises, as illustrated in the FIGURE, means GC for generating a vehicle-speed setpoint $V_{cons}$ and an engine-speed setpoint $N_{mot-cons}$, an engine-speed regulator $REG_r$ supplied by the difference between the engine speed $N_{mot}$ delivered by sensor 5 and the setpoint engine speed $N_{mot-cons}$, a vehicle-speed regulator $REG_v$ supplied by the difference between the vehicle speed $V_{veh}$ delivered by sensor 6 and the setpoint vehicle speed $V_{cons}$ delivered by generating means GC, and means $B_1$ controlled by means GC for functionally connecting engine-speed regulator $REG_r$ or vehicle-speed regulator $REG_v$ to engine-control means 7 depending on whether the vehicle speed $V_{veh}$ is lower or higher than the threshold value $V_s$.

As illustrated, means $B_1$ are composed of a "flip-flop", whose output toward engine-control means 7 is connected either to regulator $REG_r$ or to regulator $REG_v$ under the control of means GC. The latter, supplied by the signal representative of vehicle speed $V_{veh}$, compare this vehicle speed to the aforesaid threshold value $V_s$ to control flip-flop $B_1$ in corresponding manner.

In the embodiment of the inventive device represented in the FIGURE purely for illustrative and non-limitative purposes, regulators $REG_r$ and $REG_v$ deliver a torque setpoint, which supplies a converter CONV that converts this setpoint to a setpoint of the load or of the power demanded of engine 1.

When block 11 detects a degradation of the pedal information stream delivered by block ATP, that block switches the input of a second flip-flop $B_2$ from the output of block ATP to the output of converter CONV, in such a way that the output of flip-flop $B_2$ delivers, to engine-control means 7, a load setpoint suitable for ensuring engine-speed or vehicle-speed regulation as selected by set-point generating means GC.

These setpoints may be a function of, for example, the current vehicle speed $V_{veh}$, in the present case of the degradation of the pedal information stream, of the transmission ratio engaged at that time in gearbox 2, and of the state of the vehicle brakes (active or not active).

Consequently, the setpoint speed $V_{cons}$ can be fixed at a predetermined value, as a function of the transmission ratio: In particular, the setpoint speed $V_{cons}$ can be different depending on whether the vehicle is traveling forward or reversing. The setpoint speed $V_{cons}$ can also be modulated as a function of the running conditions, and in particular as a function of the vehicle speed.

Preferably, $V_{cons}$ increases with $V_{veh}$. Also preferably, the "slope" or the "rate" of increase of $V_{cons}$ as a function of $V_{veh}$ decreases as $V_{veh}$ increases.

In this latter case, however, the modulated speed is limited, for safety, to a fixed maximum value (such as 75 km/h).

The engine-speed setpoint $N_{mot-cons}$ can be a function of vehicle speed $V_{veh}$ and of the transmission ratio engaged in gearbox 2. In this way it is possible to manage the starts of movement of the vehicle differently depending on whether they are in forward or reverse direction, these starts of movement obviously taking place at low speed, below threshold speed $V_s$.

As an illustrative and non-limitative example, a value of $V_s$=15 km/h can be chosen.

The regulators can be of the PI type, for example, In this case, according to the invention, the integral term I can be managed as follows:
the integral term I is forced to zero for the entire duration of at least one of the situations of the group comprising:
vehicle in braking phase, disengagement of gearbox 2, neutral position of gearbox 2, assumed to be automatic, the integral term is fixed at the value attained by this term at the instant of intervention of a change of state of such an automatic gearbox, or at the instant of the transition from functioning of the regulator outside predetermined limits. By fixing the integral term in this way, stability of regulation is ensured.

In the case of a vehicle equipped with an automatic transmission 8, as represented in the FIGURE, the load setpoint transmitted by flip-flop $B_2$ to engine-control means 7 is also delivered to the said transmission, to manage the changes of ratio of box 2.

Thus, according to the invention, a transition from functioning of automatic transmission 8 in its own degraded mode is prevented in the event of failure of the pedal information stream. The driving comfort and safety of the vehicle are advantageously maintained in this circumstance.

In the case of braking in the presence of a degradation of the pedal information stream, the inventive device transmits, to converter CONV, a setpoint torque fixed at a minimum value to prevent the torque then being delivered by the engine from opposing the braking demanded by the vehicle operator. At the end of braking, the vehicle-speed or engine-speed setpoint is progressively re-established by adequate filtering of the applied setpoint.

Advantageously, lowering of the torque setpoint to its minimum value is triggered only upon reception of a "secured" information stream relating to activation of the braking means.

When degradation of the pedal information stream is detected and the inventive engine-control strategy is then applied, any driving-assistance systems (vehicle-speed regulator or limiter, ACC, etc.) are obviously rendered inactive. In contrast, the systems related to "primary" safety (anti-wheel-lock or anti-wheel skid, ESP, etc.) are maintained, since they are compatible with the inventive management of degradation of the pedal information stream.

During a transition of operation of the engine between its normal mode of operation and its inventive mode of operation in the presence of such a degradation, the transition is made progressive by adequate filtering of the applied load setpoint, in such a way that the operator does not become surprised by a sudden acceleration or deceleration.

As a purely illustrative and non-limitative example, there will now be described the operation of a vehicle equipped with a manual gearbox plus the inventive device, after detection of degradation of the pedal information stream. When the vehicle starts to move forward, the device transmits an engine-speed setpoint $N_{mot-cons}$.

When the vehicle speed exceeds threshold value $V_s$, the device suppresses the engine-speed setpoint and in its place transmits a vehicle-speed setpoint $V_{cons}$, which may be fixed, for example at $V_{cons}$=50 km/h.

After immobilization of the vehicle and engagement of reverse gear by the operator, a torque setpoint originating from the engine-speed regulator and smaller than that applied when the vehicle starts to move forward is transmitted to converter CONV. If the vehicle eventually exceeds a certain speed while still reversing, a transition takes place once again to a vehicle-speed setpoint, which will also be lower than that used for forward travel.

It would have been possible, in the present invention, to consider using idling-speed regulation, as is traditionally present in all motor vehicles, when the degradation of the pedal information stream, combined with the observation of a vehicle speed lower than the threshold value $V_s$, brings about establishment of engine-speed regulation. The traditionally used idling setpoint (around 1300 rpm) is too low to achieve the improvement of driving comfort and safety sought by the present invention.

It is now apparent that the invention makes it easily possible to achieve these objectives of the present invention, by virtue of the flexibility of operation of the vehicle engine that it imparts in the presence of degradation of the information stream representative of depression of the accelerator pedal.

For example, the vehicle-speed regulator of the inventive device permits a natural and correct shift of the transmission ratios of the gearbox. The engine-speed regulator, which substitutes for the vehicle-speed regulator at very low vehicle speeds, makes it possible to take into account the resultant forces applied to the vehicle (slope of the road, load of the vehicle, air conditioner or other energy consumer activated, etc.) when a vehicle is starting to move.

Of course, the invention is not limited to the described and illustrated embodiment, which has been given merely by way of example.

The invention claimed is:

1. A method for controlling a motive power group of a motor vehicle driven by an internal combustion engine, the vehicle equipped with means for controlling the motive power group, including means for forming a signal representative of depression of an accelerator pedal initiated by a vehicle operator and means for detecting any degradation of the signal representative of the depression of the accelerator pedal, the method comprising:

upon detection of degradation of the signal representative of the depression of the accelerator pedal, regulating vehicle speed when the vehicle speed is higher than a threshold value and regulating engine speed when the vehicle speed is lower than the threshold value, wherein the means for controlling the motive power group is associated with regulation means, activated by detection of degradation of the signal representative of the depression of the accelerator pedal, for regulation of the vehicle speed or the engine speed, depending on whether the speed of the vehicle is higher or lower than the threshold value, and the regulation means includes means for generating a vehicle-speed setpoint and an engine-speed setpoint, an engine-speed regulator supplied by a difference between the engine speed and the engine speed setpoint, a vehicle speed regulator supplied by a difference between the vehicle speed and the vehicle speed setpoint, means controlled by the setpoint-generating means for functionally connecting the engine-speed regulator or vehicle-speed regulator to the means for controlling the motive power group depending on whether the vehicle speed is lower or higher than the threshold value.

2. A method according to claim 1, wherein upon detection of the degradation of the signal, the vehicle speed or the engine speed is regulated by a torque setpoint which, after conversion to a load setpoint, is substituted for the degraded signal.

3. A method according to claim 1, wherein, when the vehicle speed crosses the threshold value, a progressive transition from engine-speed regulation to vehicle-speed regulation or vice versa takes place.

4. A device according to claim 1, wherein the setpoints are a function of at least one of the characteristics of a group comprising: the vehicle speed, transmission ratio of the motive power group, or active or non-active state of the vehicle brakes.

5. A method according to claim 1, wherein during a vehicle-braking period, a torque setpoint is lowered to a predetermined minimum value.

6. A method according to claim 5, adapted to a motive power group containing an automatic transmission, wherein the torque setpoint, after conversion to a load setpoint, is delivered to the automatic transmission at a same time that it is delivered to the means for controlling the motive power group.

7. A device according to claim 1, wherein at least one of the regulators is of PI type.

8. A device according to claim 7, wherein the integral term of the PI type regulator is forced to zero for an entire duration of at least one of situations of the group comprising: vehicle in braking phase, disengagement of a manual gearbox, or automatic transmission in neutral position.

9. A device according to claim 7, wherein the integral term of the PI type regulator is fixed at a value attained at an instant or intervention of at least one of the following events: change of state of an automatic transmission, or functioning of a regulator outside predetermined limits.

10. A method for controlling a motive power group of a motor vehicle driven by an internal combustion engine, the vehicle equipped with a control unit for controlling the motive power group, including a forming unit for forming a signal representative of depression of an accelerator pedal initiated by a vehicle operator and a detecting unit for detecting any degradation of the signal representative of the depression of the accelerator pedal, the method comprising:

upon detection of degradation of the signal representative of the depression of the accelerator pedal, regulating vehicle speed when the vehicle speed is higher than a threshold value and regulating engine speed when the vehicle speed is lower than the threshold value, wherein the control unit is associated with a regulation unit, activated by detection of degradation of the signal representative of the depression of the accelerator pedal, for regulation of the vehicle speed or of the engine speed, depending on whether the speed of the vehicle is higher or lower than the threshold value, and the regulation unit includes a generation unit for generating a vehicle-speed setpoint and an engine-speed setpoint, an engine-speed regulator supplied by a difference between the engine speed and the setpoint engine speed, a vehicle speed regulator supplied by a difference between the vehicle speed and the vehicle speed setpoint, a connection unit controlled by the generation unit for functionally connecting the engine-speed regulator or vehicle-speed regulator to the control unit depending on whether the vehicle speed is lower or higher than the threshold value.

* * * * *